May 26, 1970   C. W. OTTO   3,514,168
DYNAMOELECTRIC MACHINE INCORPORATING A LUBRICATED
THRUST BEARING SYSTEM
Filed Aug. 15, 1968
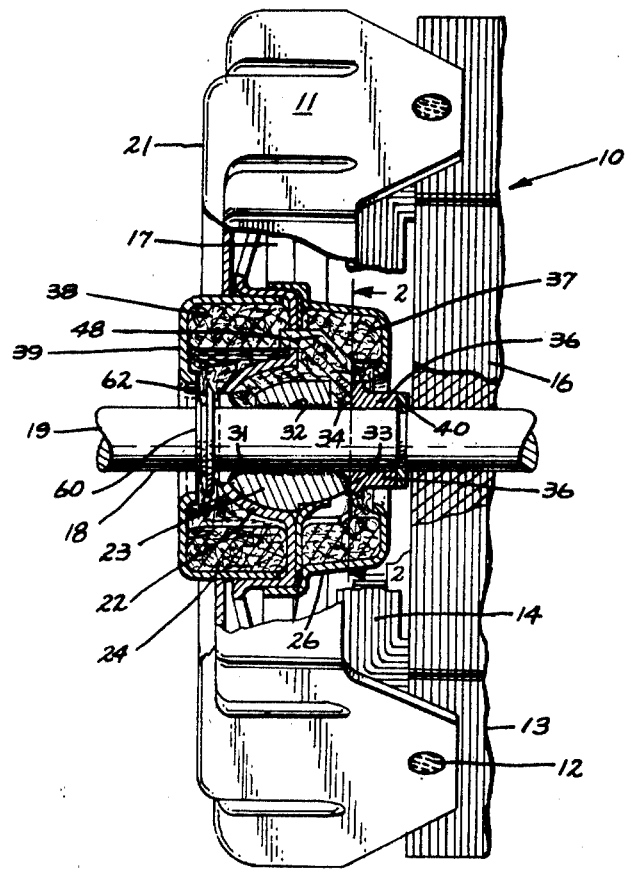
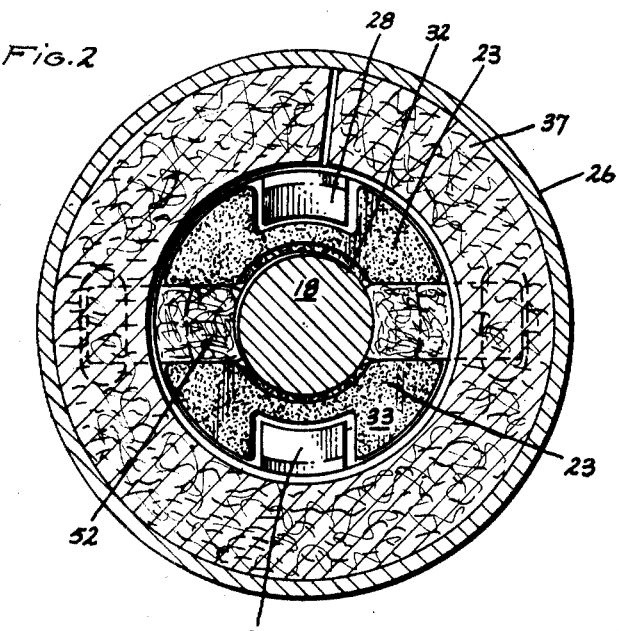
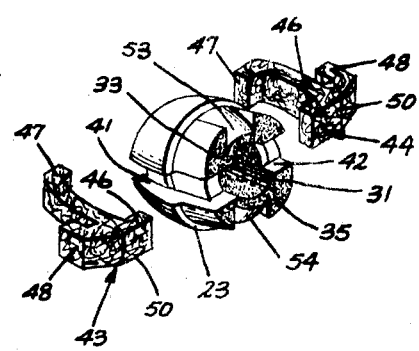
INVENTOR
CHARLES W. OTTO
by John M. Stoudt
ATTORNEY _United States Patent Office_

3,514,168
Patented May 26, 1970

3,514,168
DYNAMOELECTRIC MACHINE INCORPORATING A LUBRICATED THRUST BEARING SYSTEM
Charles W. Otto, Dekalb, Ill., assignor to General Electric Company, a corporation of New York
Filed Aug. 15, 1968, Ser. No. 753,001
Int. Cl. F16c 1/24
U.S. Cl. 308—132     11 Claims

ABSTRACT OF THE DISCLOSURE

The stationary assembly of a dynamoelectric machine incorporates an aluminum structure formed in one piece having a bearing surface for rotatably supporting a journal surface of a rotatable assembly and a thrust-receiving bearing surface cooperating with a thrust bearing surface of the rotatable assembly. The thrust-receiving bearing surface has an olefinic composition lamination which preserves said surface against oxidation, and it is applied prior to any original relative rotation between the thrust surfaces to provide initial lubrication for the thrust surfaces during operation of the machine. While this arrangement is quite efficient in effecting lubrication of the thrust surfaces, especially during initial relative rotation between these surfaces, it also is relatively inexpensive to produce. The invention pertains to the structural features of the bearing and to the manner of achieving this dual lubrication described.

Background of the invention

The present invention relates to dynamoelectric machines incorporating lubricated thrust bearing systems and, in particular, to a bearing system incorporating a combination of an olefinic bearing coating and a combination hydrocarbonmethyl stearate bearing material which provides subsequently to run-in the major bearing effect.

It has been discovered that a combination of olefinic and hydrocarbon compositions have substantial use together and have, indeed, been compounded together in numerous valuable and highly successful applications, particularly with aluminum bearing materials. For example, reference may be made to the Owens et al. Pat. No. 3,288,715 patented Nov. 29, 1966, and entitled "Fabricating Aluminum Products With Olefin Lubricant." This patent is issued to the same assignee as the assignee of this application.

It was further discovered that the olefin material need not be combined directly with the hydrocarbon material but may be used as a preliminary coating over the surface of the aluminum bearing in order to provide the lubricating effect during run-in, and after run-in a second lubricating material in the form of liquid hydrocarbon and methyl stearate was usable as supplied from a reservoir by capillary action. This copending application identified as application Ser. No. 753,000 filed Aug. 15, 1968 and invented by Nelsen is also assigned to the same assignee as the present application and its teachings are incorporated in this application. The foregoing discoveries have made it possible to make an even further advance in the bearing art by constructing the bearing components as taught in the present invention and which take full advantage of the previously referenced discovery and by reason of the present invention and the previous discoveries, it is possible to eliminate a stationary thrust plate and to utilize a steel runner which is mounted on the relatively rotatable shaft which runs directly on an aluminum bearing. The invention can utilize a standard felt wick within a notch of the aluminum bearing to supply the oil lubricant to a face of the steel runner which is in running engagement with the aluminum bearing.

The subject matter which I regard as my invention is particularly pointed out and distinctly claimed in the concluding portion of this specification. My invention, however, both as to its organization and method of operation, together with further objects and advantages thereof may best be understood by reference to the following description taken in connection with the accompanying drawing:

Brief description of the drawing

FIG. 1 is a fragmentary sectional view, partly broken away, of a dynamoelectric machine incorporating the preferred embodiment of the present invention;

FIG. 2 is an enlarged sectional view taken along line 2—2 in FIG. 1 to show details of the stationary thrust-receiving bearing construction for the preferred embodiment; and FIG. 3 is an exploded view in perspective of the stationary bearing structure having the thrust-receiving bearing surface and the lubricant capillary seen in FIGS. 1 and 2.

Description of the preferred embodiment

Turning now to a more detailed description of the drawing, the preferred form of the present invention is shown incorporated in a small or fractional horsepower size dynamoelectric machine partially illustrated in FIG. 1 and generally identified by numeral 10.

Turning now to the drawing in more detail, the preferred form of the present invention is illustrated as being incorporated in a small or fractional horsepower dynamoelectric machine 10, and more specifically in a single phase induction type electric motor having a stationary assembly formed by a pair of end frames 11 (one being shown in FIG. 1) suitably connected as by welds 12 or other suitable bonding means to the outer periphery of a stator core 13. The stator core is laminated and accommodates excitation windings 14. The rotatable assembly incorporates a standard laminated magnetic core 16 in which is disposed a secondary winding 17 of the cast squirrel cage kind having conductors extending through the core which are electrically joined together at each end by end rings. Cast integrally with each end ring are fan blades for circulation of ventilating air through the motor for cooling purposes. The core is conventionally secured to a shaft 18, such as by a pressed fit or any other convenient means, and has an output end 19 projecting beyond each end frame 11 to furnish a driving connection with a driven unit (not shown).

Considering now end frame 11 in more detail, it includes an end frame member 21 fabricated into the desired shape from sheet steel or the like having a central hub section 22 forming a socket to seat a self-aligning type bearing member 23. Retainer plate 24, having the configuration more fully revealed in my joint Pat. 3,164,-422, issued Jan. 5, 1965, is held against the hub section 22 by interior lubricant cover 26. A pair of diametrically opposed arms 27, 28 engages the periphery of bearing member 23 and permit a limited amount of initial rotational movement of the bearing within the socket to obtain axial alignment of the bearing with the rotational axis of the shaft 18 while preventing movement of the bearing in an axial direction. Tabs (not shown) which enter holes in the hub section prevent relative rotation of members 21 and 23.

With respect to bearing member 23, it is cast or otherwise formed from metallic aluminum material and has a central bore which serves as a bearing surface 31 for rotatably supporting the journal surface 32 of shaft 18.

As used herein, the term "aluminum" is intended to include compositions in which the aluminum is present in an amount equal to at least fifty percent of the total weight of the composition, as for instance the type of compositions referred to in the Owens et al. Pats. 3,208,940, issued Sept., 1965 and 3,288,715, issued Nov., 1966. Preferably, surfaces 31, 33 have an olefinic composition reacted therewith prior to assembly of the motor components in the manner more fully disclosed in the copending application Ser. No. 753,000 of Ronald N. Nelsen.

In the illustrated embodiment of the present invention, an aluminum thrust-receiving bearing surface 33 extending in a plane normal to the axis of rotation of the rotatable assembly, is provided adjacent at least the inboard side of member 36 and surface 31 within the confines of cover 26 for receiving axial thrust during operation from a thrust-transmitting bearing surface 34 of thrust member 36. This latter member is fabricated from a non-aluminum material harder than aluminum, for example, steel, and is secured onto the shaft at the proper axial location by any suitable means, such as an interference fit therewith and a split ring and groove arrangement 40. Reacted with surface 33 prior to the assembly of the end frame onto stator 13 is a thin film of olefinic composition, denoted in the drawing by reference numeral 35 (FIG. 3).

It should be noted at this time that a common lubricant transferring capillary path is provided between a suitable lubricant reservoir and both bearing surface 31 as well as stationary thrust-receiving bearing surface 33. With respect to the illustrated lubricant reservoir, it comprises communicating inner and outer chambers each having an annulus or ring 37, 38 of lubricant absorbent material such as compressed felt retained within associated cup-shaped cover members 39, 26. In order to supply lubricant directly to cooperating thrust bearing surfaces 33, 34 stationary thrust-receiving surface 33 is interrupted circumferentially by a pair of diametrically opposed radial openings or slots 41, 42 which extend into the bearing bore adjacent the inboard side of member 23, as best seen in FIG. 3. Similar openings may be furnished at the outboard end of the same member, especially desirable when a stationary aluminum thrust-receiving bearing surface is provided for cooperation with a second thrust-transmitting bearing surface (not shown).

In order to effect capillary transfer of lubricant from the reservoir to the desired locations, two similar wick elements 43, 44 fabricated from lubricant absorbent material, such as compressed felt or the like, have radial fingers 46, 47 disposed in the openings and are integrally connected together by an axial extension which fits in a complementary groove 41, 42 in the outer periphery of member 23. An axial finger 48 is joined thereto and is adapted to project between rings 37, 38 to facilitate lubricant transfer.

Lubricant is thrown radially outwardly against absorbent ring 37 by the thrust member 36 which serves as an oil flinger, thereby causing a constant circulation of lubricant within the reservoir. The lubricant contained in the reservoir may consist of any suitable combination of a liquid hydrocarbon and methyl stearate, the exact composition of which may vary, but for specific examples of materials, reference may be made to those indicated in the copending application Ser. No. 753,000 invented by Nelsen and assigned to the same assignee as the present invention.

In contrast to the bearing lubricating and support assembly disclosed in Patent No. 3,164,422, the present invention does not require but in fact has totally eliminated the stationary thrust plate which was previously a part of the combination disclosed in said Pat. No. 3,164,422, thereby effecting both an economy of manufacture, assembly, and maintenance.

At the outboard end of the shaft 18 is a retaining element 60, and oil flinger 62. Thus, any oil which leaks into the oil well at the left hand side is thrown by the flinger against the annulus or ring 38 of lubricant absorbent material for continuous recirculation. During operation, lubricant is continuously circulated through the wick elements 43, 44 and the radial fingers 46, 47 onto the journal surface of shaft 18 and the thrust surface 34 of thrust member 36 by means of the radial fingers 46, 47 which derive their source supply from the engagement of axial fingers 48 which are in contact with each of the annulus or rings 37, 38 of lubricant absorbent material, and any oil which tends to leak axially inward or outward is returned by the oil flinger action. Thus, the oil becomes continuously available for resupply and is continuously recirculated to the bearing surfaces.

A lubricant film is thus continuously provided to the shaft journal and the bearing, and lubricant film is maintained for satisfactory running conditions of the shaft which is supported by a fluid film of lubricant, and no metal-to-metal contact occurs between the bearing member 23 and the journal shaft 18. The total lubricating effect is, of course, a combination of a run-in lubricant provided by the olefinic material initially applied to the surface 31 of the bearing 23 as described in copending applications and patents previously cited and after the critical run-in period, the bearing considerations are dictated by the combination hydrocarbon and methyl stearate. By utilizing the two pairs of radial fingers 46, 47, the shaft journal is engaged in two axially spaced locations and when uneven loading is effected upon the journal, one pair of radial fingers will contact the shaft journal at a high pressure zone and the other pair at a low pressure zone, thus distributing the oil between the high and low pressure zones respectively and effecting a distribution suitable for the high and low pressure conditions respectively.

It should be apparent that all of the functional advantages previously described in Shaffer 3,164,422 together with all of the important advantages in the way of advancements in the bearing art have been carried over and form a part of the present invention. There has been further effected a substantial advance in the art in respect to the new and improved bearing arrangement obtained between thrust member 36 and bearing element 23 and in particular, the functional bearing surfaces 34, 33 of the thrust member and bearing, respectively. The surface 33 is, of course, coated with an olefinic material so that it has the same bearing characteristics as the surface 31 in contact with the journal 18, and in addition, hydrocarbon-methyl stearate combination is supplied continuously to the same bearing surfaces 33, 34 respectively by the radial fingers 46 which have facial sections 50, 52 which continuously supply lubricant from the reservoir for the surfaces 33, 34. Thus, the two surfaces 33, 34 are lubricated with the same lubricating action and efficiency as provided between the journal shaft and the bearing member. Moreover, the supply of lubricant is substantially to the same extent in this confluence.

While the invention has been explained by describing a selected example embodiment thereof, it will be apparent that many modifications may be made without departing from the spirit of the invention, and it is, therefore, intended to cover all such equivalent variations which are within the scope of the appended claims.

I claim:

The embodiments of the invention in which an exclusive property or privilege is claimed are defined as follows:

1. A dynamoelectric machine comprising a rotatable assembly having a rotatable thrust-transmitting bearing surface and a journal surface; and a stationary assembly including a thrust-receiving bearing surface facing the thrust-transmitting bearing for cooperating with and accepting thrust from the rotatable assembly, with one of the thrust bearing surfaces being formed of aluminum; an aluminum bearing surface rotatably supporting the rotatable assembly through the journal surface; and at least said one thrust bearing surface having an olefinic composition reacted therewith prior to original relative rotation of the thrust bearing surfaces to protect the one thrust bearing surface from oxidation and to provide initial lubrication for the thrust bearing surfaces during the original relative rotation.

2. The dynamoelectric machine of claim 1 in which the one thrust bearing surface is the thrust-receiving bearing surface, the thrust-transmitting bearing surface is formed of a metal other than aluminum, and the aluminum bearing and the thrust-receiving bearing surfaces are integrally joined together in one piece in the stationary assembly to facilitate their formation.

3. The dynamoelectric machine of claim 1 in which the stationary thrust-receiving bearing surface is formed of aluminum and has openings therein facing the rotatable thrust-transmitting bearing surface, and means is disposed in the openings for conveying lubricant directly between the thrust bearing surfaces during operation of the dynamoelectric machine.

4. The dynamoelectric machine of claim 3 in which the openings through the stationary thrust-receiving bearing surface also extend to the aluminum bearing surface, and the lubricant conveying means disposed in the openings serves to transfer lubricant to the associated bearing and journal surfaces as well as to the associated thrust surfaces.

5. The dynamoelectric machine of claim 4 in which the aluminum bearing surface also includes an olefinic composition reacted therewith prior to the original relative rotation of the thrust bearing surfaces.

6. The dynamoelectric machine of claim 2 in which the stationary assembly includes a lubricant reservoir for storing the lubricant for use during dynamoelectric machine operation and a lubricant conveying means in communication with the lubricant reservoir for transferring lubricant by capillary action from the reservoir to the associated bearing and journal surfaces as well as the associated thrust surfaces during operation of the dynamoelectric machine.

7. A dynamoelectric machine comprising a rotatable assembly having a thrust-transmittting surface and a journal surface; and an end frame assembly including a load supporting bearing surface rotatably supporting the journal surface and a thrust bearing surface formed adjacent one end of the bearing surface and facing the thrust-transmitting surface for accepting thrust directly therefrom; said bearing surfaces being formed of aluminum, with at least one of the bearing surfaces having an olefinic composition reacted therewith; a lubricant reservoir mounted in the end frame assembly for storing lubricant for use during dynamoelectric machine operation; and means for conveying lubricant from the reservoir to the bearing surfaces including capillary paths extending through the thrust bearing surface, between the lubricant reservoir and the thrust bearing surface, for feeding lubricant directly to the thrust surfaces during dynamoelectric machine operation with said capillary paths also extending to the load supporting bearing surface for lubricating purposes.

8. The dynamoelectric machine of claim 7 in which the lubricant includes a mixture of hydrocarbon oil, methyl stearate, and an olefinic composition, and the thrust-transmitting surface is formed of non-aluminum metal.

9. The dynamoelectric machine of claim 7 wherein said means for conveying lubricant from the reservoir to the bearing surfaces effect continuous recirculation of lubricant to effect a continuous supply by capillary action to the load supporting bearing surfaces, to the thrust surfaces and to the thrust-bearing surface during dynamoelectric machine operation.

10. A dynamoelectric machine comprising a rotatable assembly having a thrust-transmitting surface and a journal surface; an end frame assembly including a load-supporting bearing surface rotatably supporting the journal surface and having a thrust bearing surface formed adjacent one end of the bearing surface in alignment with said thrust-transmitting surface to accept thrust directly therefrom; at least one of the thrust-transmitting surface and thrust bearing surface being of aluminum composition and having an olefinic composition lamination reacted therewith, a lubricant reservoir mounted in said end frame assembly for storing lubricant therein, and means for a continuously supplying lubricant from the reservoir to the bearing surfaces for feeding lubricant directly to the thrust-transmitting and bearing surfaces.

11. In a dynamoelectric machine having relatively fixed and movable load supporting and force-transmitting surfaces, a journal shaft, means operatively connected to said journal shaft, and providing a thrust-transmitting surface thereon, a bearing element mounted on said journal shaft and having a bearing surface in coacting bearing engagement with said journal shaft and further including a thrust-transmitting surface complementary with the thrust surface of said means mounted on said journal shaft, an olefinic lamination provided between the relative contacting surfaces of said journal shaft, said bearing element and said means, a lubricant reservoir, and means for conveying lubricant from said reservoir to the bearing surfaces and thrust-transmitting surfaces between said bearing, said means, and said journal shaft.

References Cited
UNITED STATES PATENTS

| | | | |
|---|---|---|---|
| 2,892,664 | 6/1959 | Howes et al. | 308—132 |
| 3,224,819 | 12/1965 | Hunt | 308—132 |
| 3,280,027 | 10/1966 | Pierre et al. | 255—45 |
| 3,164,422 | 1/1965 | Shaffer et al. | 308—132 |

MARTIN P. SCHWADRON, Primary Examiner

F. SUSKO, Assistant Examiner